United States Patent
Atlas et al.

(10) Patent No.: US 7,929,035 B2
(45) Date of Patent: Apr. 19, 2011

(54) ULTRA LOW NOISE CMOS IMAGER

(75) Inventors: Eugene Atlas, Irvine, CA (US); Sarit Neter, Irvine, CA (US); Kim Loren Johnson, Carlsbad, CA (US)

(73) Assignee: Imagerlabs, Inc., Monrovia, CA (US)

( * ) Notice: Subject to any disclaimer, the term of this patent is extended or adjusted under 35 U.S.C. 154(b) by 714 days.

(21) Appl. No.: 11/683,868

(22) Filed: Mar. 8, 2007

(65) Prior Publication Data

US 2008/0218620 A1 Sep. 11, 2008

(51) Int. Cl.
*H04N 3/14* (2006.01)
*H04N 5/335* (2006.01)
*H01L 27/00* (2006.01)

(52) U.S. Cl. ............ 348/304; 348/302; 250/208.1
(58) Field of Classification Search .......... 348/297, 348/301–304, 307–308, 364
See application file for complete search history.

(56) References Cited

U.S. PATENT DOCUMENTS

| | | | |
|---|---|---|---|
| 5,625,414 A * | 4/1997 | Manning | 348/312 |
| 6,528,245 B2 | 3/2003 | Kozlowski | |
| 6,809,767 B1 | 10/2004 | Kozlowski et al. | |
| 6,980,243 B2 * | 12/2005 | Miyawaki et al. | 348/302 |
| 7,154,548 B2 | 12/2006 | Liu | |
| 2008/0002043 A1 * | 1/2008 | Inoue et al. | 348/296 |

OTHER PUBLICATIONS

Mendis et al., A 128 x 128 CMOS Active Pixel Image Sensor for Highly Integrated Imgaing Systems, IEEE, 1993, pp. 583-586.

* cited by examiner

*Primary Examiner* — Kelly L Jerabek
(74) *Attorney, Agent, or Firm* — Haynes and Boone, LLP.

(57) ABSTRACT

A column buffer for use with a pixel cell array includes an amplifier coupled to three read-out circuits in parallel providing a signal corresponding to accumulated photon-generated charge in a pixel cell plus noise, a reset level plus noise, and a pedestal level, respectively. These three signals are used to generate an ultra-low noise signal $D_i = S_i - P_{i-1} - G^*(R_i - R_{i-1})$, wherein S is the sampled signal, P is the pedestal level, R is the reset level, and G is a gain associated with a pixel cell, and wherein i is a frame number greater than 0. The three signals can be read-out simultaneously. In another embodiment, the three signals are obtained from a column buffer having only one output. In this case, the signals are read-out sequentially.

20 Claims, 8 Drawing Sheets

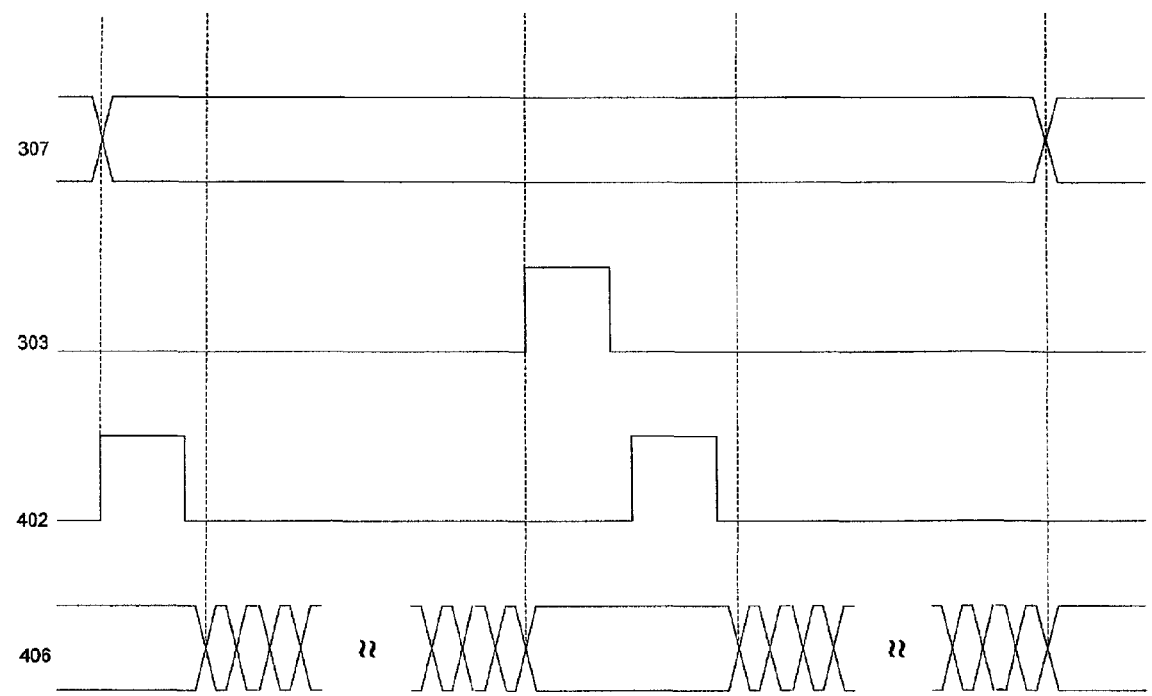

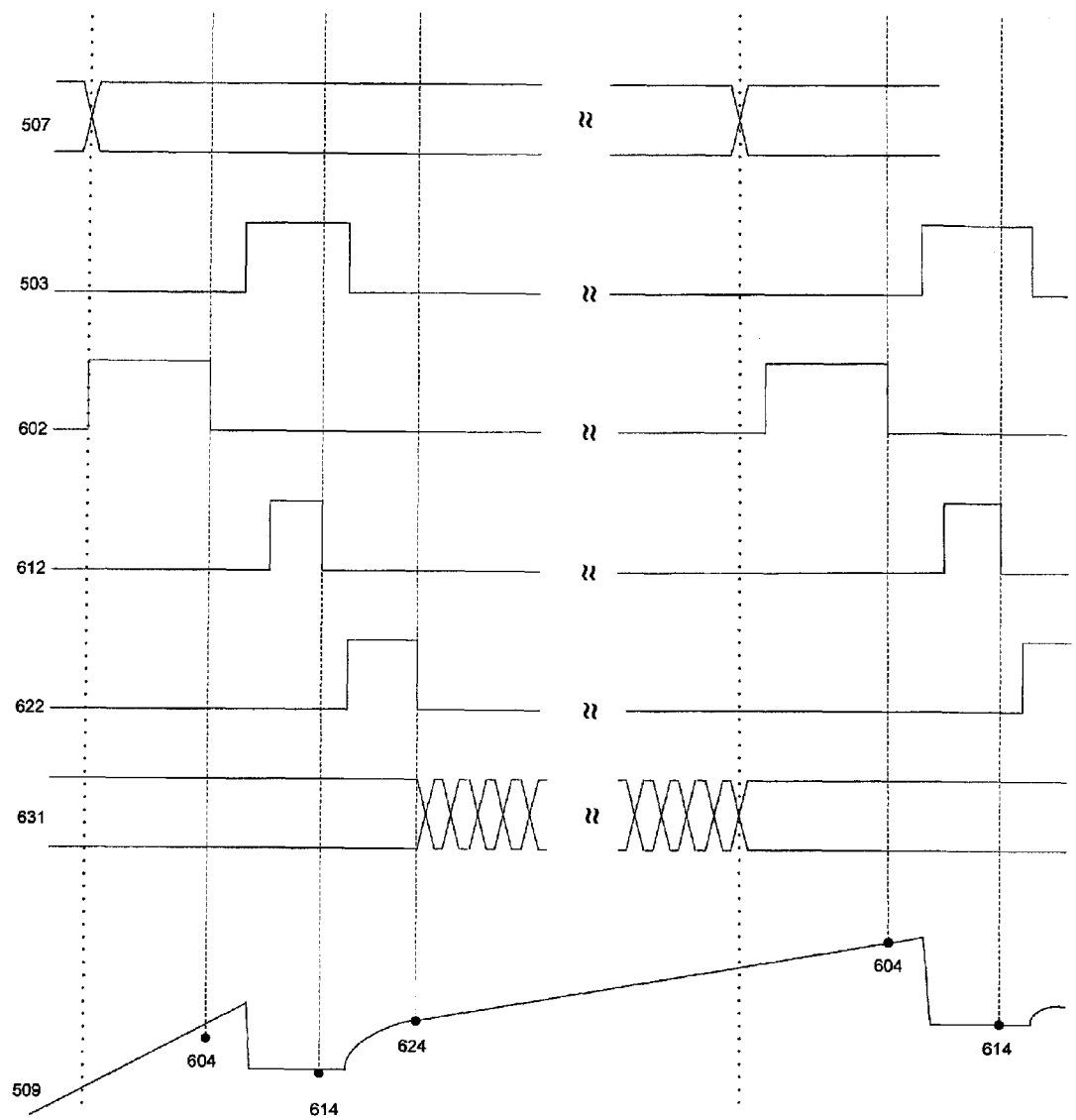

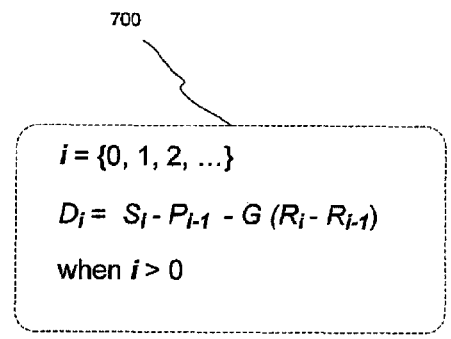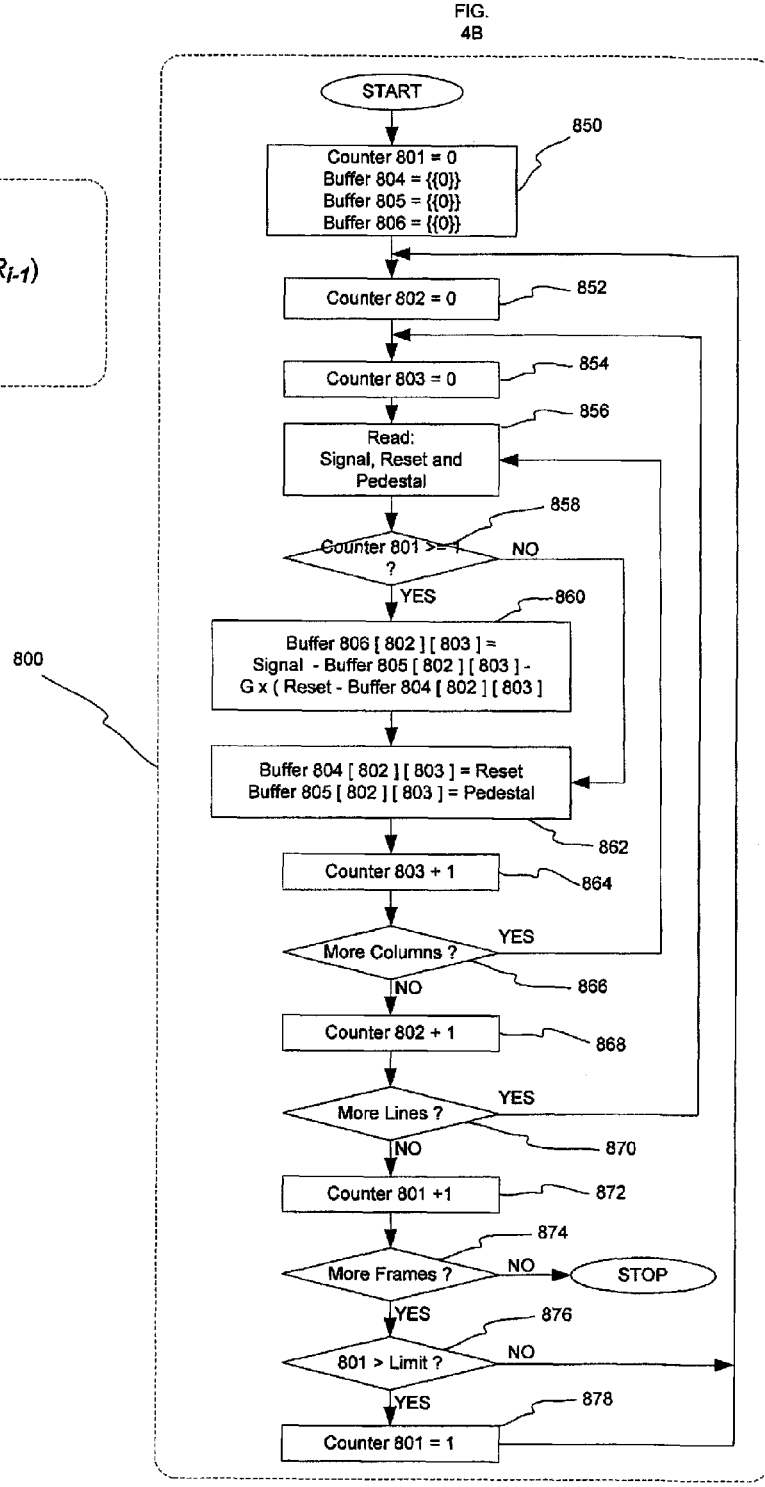

ULTRA LOW NOISE CMOS IMAGER

BACKGROUND

1. Field of the Invention

The present invention relates to semiconductor devices and, in particular, to complementary metal oxide semiconductor (CMOS) image sensors.

2. Related Art

CMOS imagers have been greatly improved and have been increasingly used in diverse and demanding applications. A typical CMOS imager comprises a focal plane array of pixel cells or pixels, where each pixel comprises a light detection component such as a photodiode, a photo gate, or a photoconductor. Each pixel also has a readout circuit that is connected to its light detection node and may also include a sample-and-hold circuit for electronic shutter control, either before or after the readout circuit. The CMOS imager pixel cell may include at least one transistor for transferring charge from a charge accumulation region of the substrate to the light detection node, which can be a floating diffusion node, and a transistor for resetting the light detection node to a predetermined charge level prior to charge transfer.

A widely used Active Pixel Sensor (APS) is the 3-Transistor (3T) design which comprises a photodiode that is typically reversed-biased, a reset transistor, an amplifier transistor, and a select transistor that connects the pixel to the column bus and allows the signal transfer from the pixel to the column amplifier. This APS design suffers from Fixed Pattern Noise (FPN), kTC Reset noise, and 1/f noise (for low frame rates), and when normally operated provides, performance in the range of 40 to 20e− noise with proper FPN rejection and is dominated by kTC Reset noise.

In order to reduce the kTC noise that afflicts the 3T APS, an APS design having four transistors (4T) with pinned photodiode has been often used. The 4T APS comprises a pinned photo diode that is typically fully depleted, a transfer transistor which provides Correlated Double Sampling (CDS) functionality connected to the light detection node, a reset transistor, an amplifier transistor which could be, e.g., a Source Follower (SF) or an inverting amplifier that converts the integrated photocharge into a voltage and transfers the voltage to the column bus when selected, and a select transistor that connects the pixel to the column bus and allows the signal transfer from the pixel to the column buffer. Two sampling operations are performed. First, the reset level voltage ($V_{RESET}$) is transferred to the column buffer while the column buffer sample-and-hold (SH) is clamped to a known voltage ($V_{CLAMP}$). The transfer transistor is off, and the pinned photodiode acts as a memory for the integrated charge. After the clamp is released and the transfer switch is closed, the signal corresponding to the entire integrated charge stored on the pinned photodiode is transferred to the column buffer SH providing kTC reduction. A 4T APS with a typical column buffer circuitry that support CDS is depicted in FIG. 1A, with an associated timing diagram in FIG. 1B, both of which will be described below.

However, the widely used 4T Pinned Photodiode APS circuit, while reducing the kTC noise and fixed pattern noise (FPN) via the CDS operation and circuitry, suffers from several issues. The first problem is that a pinned photodiode is not available in a standard CMOS process. It is of limited availability (i.e., many fabs do not provide it) and of a higher cost. The second problem is a lowered dynamic range due to the limited charge storage capacity of a fully depleted pinned photodiode. Lastly, the noise reduction, reported to be at best around 3e−, is still not sufficient for applications that require sub-election noise.

To overcome the issues related to the pinned photodiode, another approach of performing the CDS outside the CMOS pixel array (also referred to as "off-chip" CDS) has been widely used. In this approach, a conventional 3T APS and column buffer can be used. The 3T APS comprises a photodiode that is typically reversed biased, a reset transistor, an amplifier transistor (typically a Source Follower), and a row select transistor. The column buffer typically contains a sample-and-hold transistor, a sample-and-hold capacitor, a driver amplifier, and a column select transistor. The pixel is read twice sequentially. The first time is at the end of integration period, and the second time is after the photodiode reset. The reset sample is then subtracted from the corresponding signal level in a circuit that resides off the CMOS pixel array, thus providing the kTC and FPN reduction.

However, the off-chip CDS technique has several problems. The first is 1/f noise due the time gap between the reset sampling and the signal sampling. 1/f noise manifests itself as a temporary change in the threshold of the amplifier MOSFET. The 1/f noise becomes the dominant noise source as the frame rate decreases, in particular frame rates below 100 Hz. In addition, faster readout circuitry is required to provide for the double readout. This may increase the noise band and may increase price and complexity. As with the on-chip method, the best results have not surpassed 2-3e−. Thus, both APS with on-chip and off-chip CDS do not achieve the ultra low noise of sub-electron that is required for extreme applications, such as scientific, astronomy, night vision, and such, where ultra low noise Charge Coupled Devices (CCD) are dominant.

SUMMARY

In one aspect, the present invention provides an active pixel sensor and column buffer with ultra-low noise performance through triple sampling operation and circuitry. An active pixel sensor cell array may be implemented with minimum additional circuitry in the column buffer and without increasing the pixel cell size. In one implementation, the column buffer for an active pixel cell in an active pixel sensor array improves performance by reducing FPN, kTC noise and 1/f noise, thus lowering the total noise of the pixel to sub-electron.

In one aspect of the present invention, a radiation sensitive element, such as a photodiode, is provided in the active pixel sensor cell for sensing incident radiation that may be, but not limited to, visible light spectrum, long wavelength spectrum such as infrared (IR), shortwave spectrum such as ultraviolet (UV), high energy particles and X-rays. The voltage corresponding to the photon-generated or other radiation-generated charge in the active pixel sensor cell is sampled onto the output bus at the end of the integration time period. Additional elements, such as source follower transistors or capacitors, may reside between the sensing element and the output bus. The output is sampled via an amplifier transistor a minimum of three times to obtain at least the following three samples: the signal level at the end of integration, the reset level, and the pedestal at the beginning of integration. These three samples provide the means to reduce FPN, kTC and 1/f noise effect via a unique processing of the samples in the column buffer circuitry of this invention.

The active pixel sensor cell may be part of an array of active pixels array that further comprises timing circuitry for controlling reset, sampling and other operations, amplification blocks, and so on.

In one embodiment, a column buffer includes an amplifier having an input terminal coupled to outputs of pixel cells in an array. The output terminal of the amplifier is coupled to three read-out circuits, although the number may be more or less. The first read-out circuit provides a signal corresponding to the photon-generated charge accumulated on a light sensing element in the pixel cell plus noise, the second read-out circuit provides a signal corresponding to a reset level plus noise, and the third read-out circuit provides a signal corresponding to a pedestal level. In one embodiment, each circuit includes a first transistor acting as a switch to transfer the voltage from the amplifier output to a sample and hold capacitor. The first transistor and the capacitor are connected in parallel to a driver amplifier, whose output is coupled to a second transistor which is operable to place a sampled signal on an output line for processing. The first transistors are controlled by separate signals, while the second transistors are controlled by the same column select signal. Sampled signals representing the signal level S, the reset level R, and the pedestal P are then used to generate an ultra-low noise signal Di according to $D_i = S_i - P_{i-1} - G*(R_i - R_{i-1})$, where i is the frame number and greater than zero.

These and other features and advantages of the present invention will be more readily apparent from the detailed description of the preferred embodiments set forth below taken in conjunction with the accompanying drawings.

BRIEF DESCRIPTION OF THE FIGURES

FIG. 2B shows an exemplary timing for the 3T APS of FIG. 2A.

FIG. 3B shows an exemplary timing diagram for the operation of the active pixel sensor cell and column buffer of FIG. 3A.

FIG. 4A shows an exemplary triple sampling processing algorithm.

FIG. 4B shows an implementation for the triple sampling processing of FIG. 4A.

Like element numbers in different figures represent the same or similar elements.

DETAILED DESCRIPTION

Figure 1A:
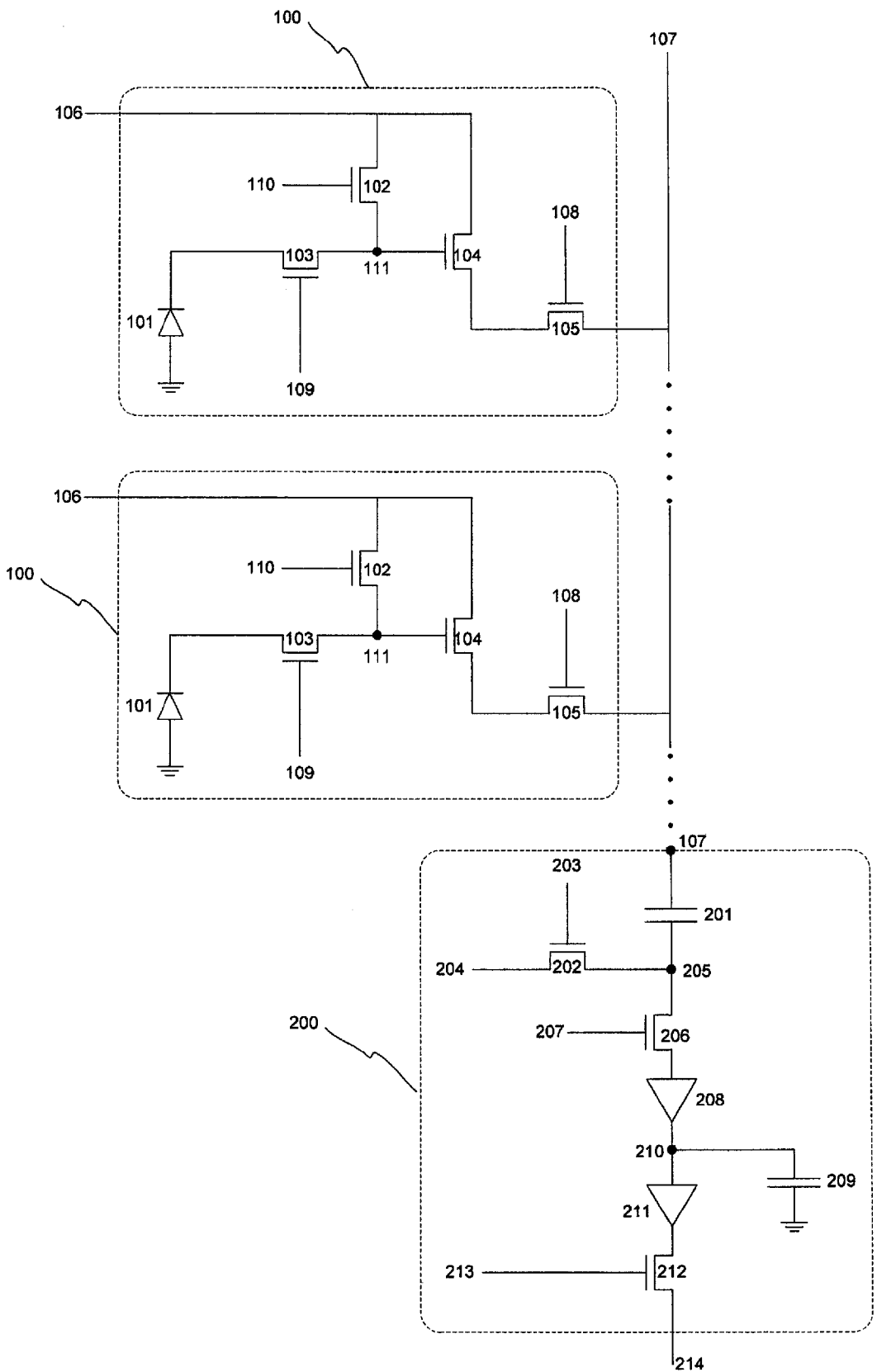
FIG. 1A shows a prior art Active Pixel Sensor (APS) of 4T (4 Transistors) with pinned photodiode and Column Buffer design.

FIG. 1A depicts a prior art Active Pixel Sensor (APS) of four transistors (4T) and Column Buffer design that provides on-chip CDS (correlated double sampling). The active pixel sensor cell is typically (but not always) realized with N-type transistors. A CMOS imager comprises an array of pixels, two of which are shown here. Both pixels 100 are identical. Pixel 100 includes a fully depleted pinned photodiode 101 overlying a doped region of a substrate for accumulating photo-generated charge during an integration period. Photodiode 101 is emptied when the charge accumulated on it is transferred to an amplifier 104 via a transfer transistor 103. Amplifier 104 is reset prior to charge transfer via a reset switch or transistor 102 which is controlled by a reset clock 110 provided to its gate. Transfer transistor 103 provides means of transferring the charge from the collection region and providing a corresponding voltage level on the gate of amplifier transistor 104 (e.g., a Source-Follower). A select transistor 105, which is controlled by a row select clock 108, outputs the signal on to a column bus 107. Two transfers to the output buffer occur during row selection. The first is the amplifier reset plus noise (i.e., kTC+FPN) and the second is the signal corresponding to the photon generated charge on photodiode 101.

The signal on column bus 107 is processed in a column buffer 200 that comprises an AC-coupled capacitor 201, a clamp transistor 202 that is controlled by a clamp signal 203 and is provided with a predefined clamp voltage 204, a sample-and-hold (SH) switch or transistor 206 controlled by a SH clock 207, a SH buffer amplifier 208, a SH capacitor 209, a high speed bus driver amplifier 211, and a select transistor 212 that is controlled by a column select clock 213. During the time the pixel is selected (i.e., row select clock 108 is high and transistor 105 is on), two sample-and-hold operations occur. The first SH is during reset and the second during the transfer of the previously accumulated charge stored on pinned photodiode 101. During the first sample and hold operation, AC capacitor 201 holds the voltage difference between the $V_{CLAMP}$ on a clamp node 205 and $V_{RESET}$+Noise on column bus node 107, while SH capacitor 209 holds $V_{CLAMP}$. During the second sample and hold operation, when the clamp transistor 202 is off and transfer transistor 103 is on, SH capacitor 209 tracks the change in voltage on AC-coupled capacitor 201, which is equal to the voltage corresponding to the photon generated charge stored on photodiode 101.

Figure 1B:
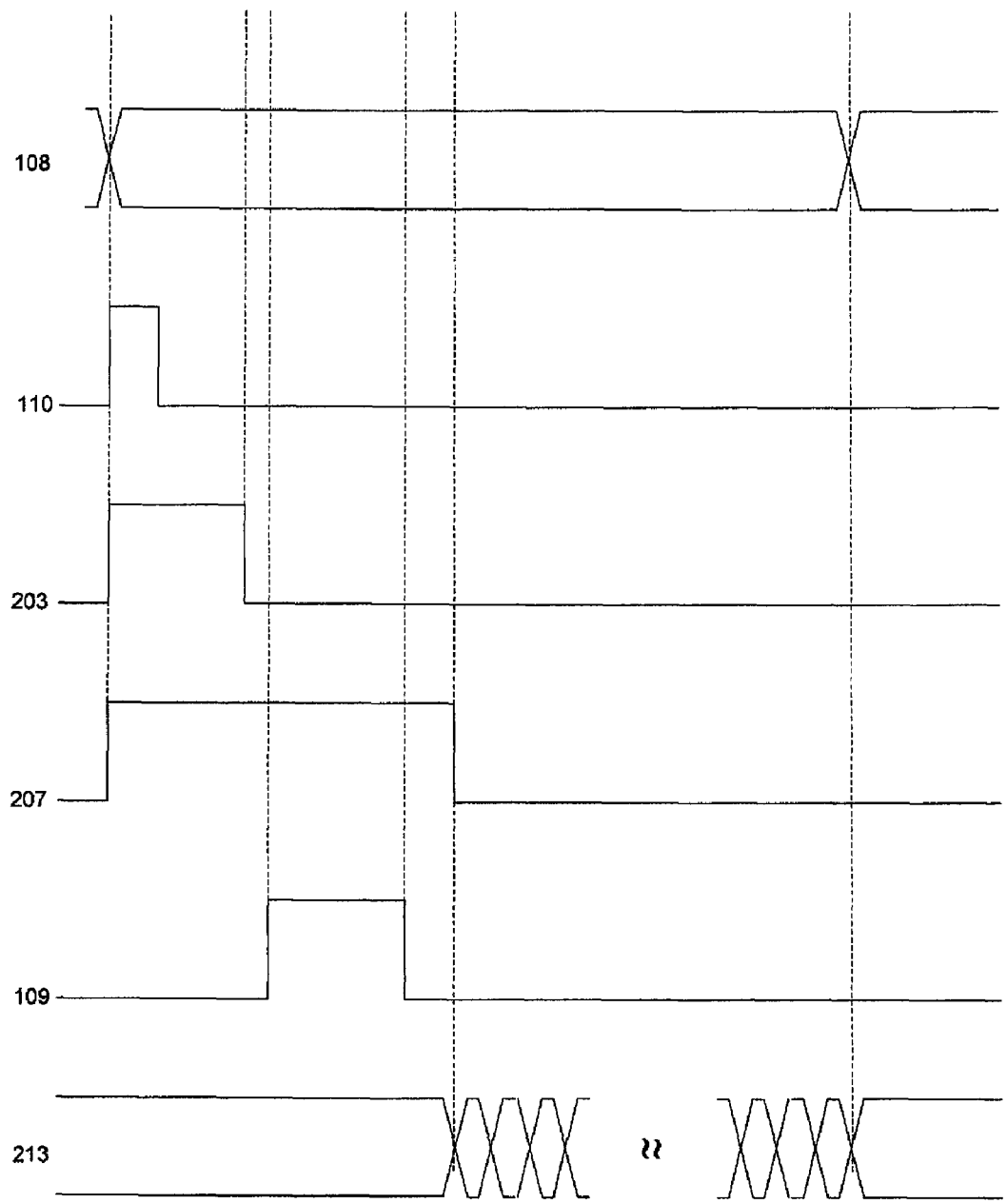
FIG. 1B shows an exemplary timing for the 4T APS of FIG. 1A.

FIG. 1B shows a timing diagram for operating pixel 100 with column buffer 200 to provide on-chip CDS. Pixels residing in a row are sampled during a cycle of row select clock 108. First, clamp signal 203 is set high and clamp transistor 202 of column buffer 200 is turned on, setting sense node 205 to clamp voltage 204. At the same time, a pulse from reset clock 110 is provided on the gate of transistor 102, resetting amplifier 104. During that time, transfer clock 109 is low and transistor 103 is off, thus allowing pinned photodiode 101 to act as storage for the charge accumulated during the integration period. The reset operation injects the kTC noise (reset noise) on the gate of amplifier 104, and the voltage delta between the clamp level and reset offset+kTC is held across capacitor 201. As explained previously, SH capacitor 209 holds the clamp voltage. This provides the first sample which is the reference level. Next, clamp signal 203 goes low, and clamp transistor 202 is turned off. A pulse from transfer clock 109 turns transfer transistor 103 on, allowing the transfer of the charge stored on the photodiode to amplifier 104, thus changing the voltage on capacitor 201 and SH capacitor 209 by the same amount. This provides the second sample, which is the signal level. Once SH clock 207 goes low, column select clock 213 goes high, allowing the signal to be read out onto an output bus 214. This completes the CDS operation that provides the KTC and FPN reduction since the signal level on SH capacitor 201 is referenced to the known level of the clamp voltage.

As can be clearly seen, the on-chip CDS depends on the pinned photodiode and the transfer switch for the photon generated charge storage capability. The pinned photodiode is a limiting factor for dynamic range due to its low full-well capacitance. In addition, it requires a specialized process that is not available in most widely-used fabs.

Figure 2A:
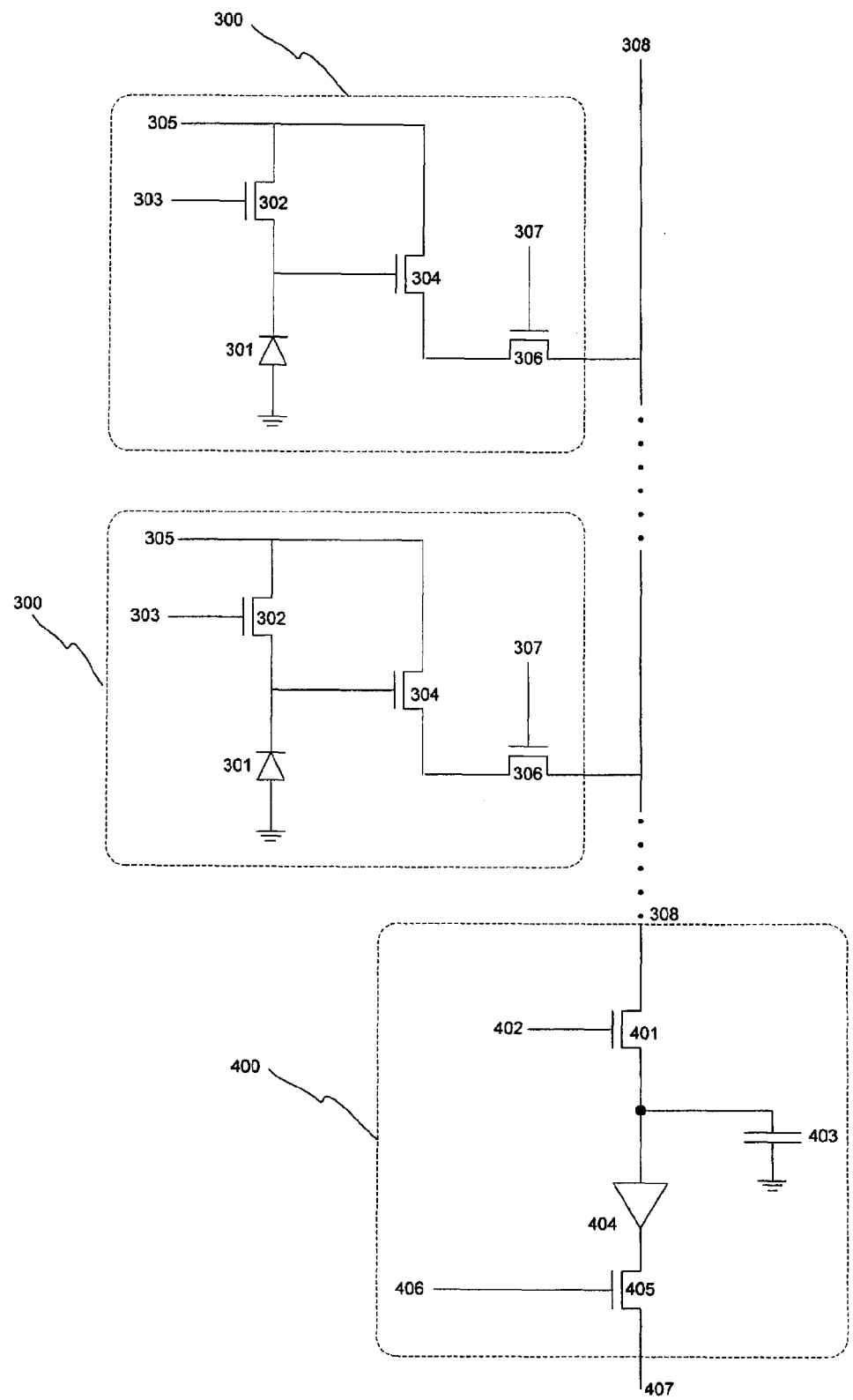
FIG. 2A shows a prior art Active Pixel Sensor (APS) of 3T (3 Transistors) with non-pinned photodiode and Column Buffer design.

FIG. 2A depicts a prior art Active Pixel Sensor of three transistors (3T) and column buffer design that may be operated to provide for an off-chip CDS (correlated double sampling). The active pixel sensor cell is typically (but not always) realized with N-type transistors. A CMOS imager comprises an array of pixels, two of which are shown here. Both pixels 300 shown here are identical. Pixel 300 includes a reversed-biased photodiode 301 overlying a doped region of a substrate for accumulating photo-generated charge during an integration period. Photodiode 301 is reset high to a voltage 305, which is typically VDD that depends on the process. An amplifier 304, typically a source-follower, converts the charge from the collection region and provides corresponding voltage level on a column bus 308 when a select transistor 306 is on. The signal is then read out by a column buffer 400. Select transistor 306 is controlled by a row select clock 307. Two distinct sequential readouts of two samples are performed. First, the voltage corresponding to the photon-generated charge on photodiode 301 plus noise (i.e., kTC and FPN) is sampled by a SH capacitor 403 in column buffer 400 and read out via output bus 407. Second, photodiode 301 is reset and the charge voltage corresponding to the Reset+Noise is sampled by SH capacitor 403 and read out via output bus 407. The samples from consecutive frames are available for subtraction by an off-chip appropriate block.

FIG. 2B provides a timing diagram for operating pixel 300 with column buffer 400 to provide off-chip CDS. Pixels reside in a row are sampled during a cycle of a row select clock 307. First, the previously accumulated photon-generated charge on photodiode 301 is sampled on the falling edge of a first one of sample and hold pulse 402. The signal sample for each pixel in the row is then read out during read-out cycles 406. Next, photodiode 301 is reset on the falling edge of a reset pulse 303. Once settled, the reset level+noise is sampled on the falling edge of a second one of sample and hold pulse 402. The reset sample for each pixel in the row is then read out during read-out cycles 406. Once off-chip, the previous reset sample stored is subtracted from the signal level providing the CDS functionality.

As can be clearly seen, the time gap between the two samples (i.e., reset and signal) depends on integration time and is susceptive to 1/f noise. The problem becomes severe for very slow frame rates (long integration times), such as frame rates below 100 Hz. In addition, to provide for the double readout, a faster circuitry is required.

Figure 3A:
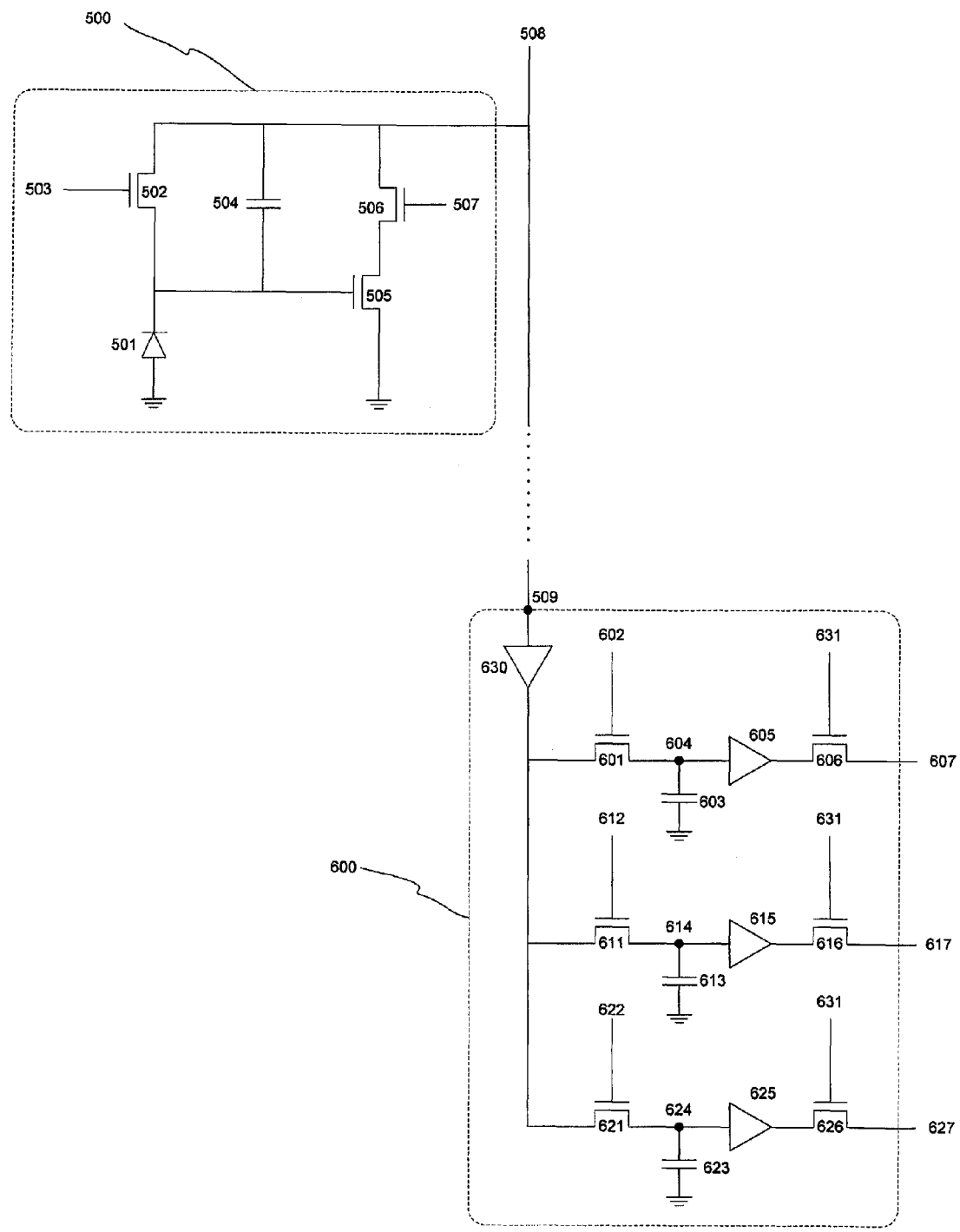
FIG. 3A shows a portion of a CMOS active pixel sensor array that comprises one active pixel sensor cell and column buffer in accordance with one embodiment of the current invention.

FIG. 3A is a schematic diagram of a portion of a CMOS active pixel sensor array that comprises one active pixel sensor (APS) cell 500 and one column buffer 600 in accordance with one embodiment of the current invention. The implementation of APS cell 500 and column buffer 600 is with N-channel devices but is not limited to that and can be implemented in P-channel devices as well. Cell 500 may be connected to additional cells contained in the array via a column output bus 508. Cell (or "pixel") 500 comprises a light sensing device 501 that is, but is not limited to, a reversed bias photodiode overlying a doped region of a substrate for accumulating photon-generated charge during an integration period. Pixel 500 further comprises an integrating capacitor 504 coupled to photodiode 501 for integrating the charge accumulated on the photodiode 501 and a reset transistor 502 controlled by a reset signal 503 for resetting photodiode 501 to a predefined voltage. Photodiode 501 integrates photon-generated charge down from the reset level. Pixel 500 also comprises an inverting amplifier transistor 505 and a select transistor 506 clocked by a row select 507 signal controlling output to a column Bus 508. Inverting amplifier 505, select transistor 506, and capacitor 504 are configured to form a cascode amplifier with gain >1, where transistor 506 provides the biasing and capacitor 504 the feedback. When select transistor 506 is on, the pixel output appears on a column bus node 509 and is processed by column buffer 600. Details on pixel 500 can be found in commonly-owned U.S. patent application Ser. No. 10/304,799, entitled "Active Pixel Sensor Cell Array", filed Nov. 25, 2005, which is incorporated by reference in its entirety.

Column buffer 600 comprises a low noise settling amplifier 630 connected to column bus 508 and three read-out circuits to allow for three simultaneous outputs of three samples. The first (or signal) read-out circuit provides a signal corresponding to the photon-generated charge accumulated on photodiode 501+noise and comprises a sample-and-hold (SH) switch transistor 601 controlled by a signal 602, a SH capacitor 603, a high speed bus driver amplifier 605, a select transistor 606 clocked by a column select signal 631, and an output bus 607. The second (or reset) read-out circuit provides a signal corresponding to the reset+noise and comprises a SH switch transistor 611 controlled by a signal 612, a SH capacitor 613, a high speed bus driver amplifier 615, a select transistor 616 clocked by column select signal 631, and an output bus 617. The third (or pedestal) read-out circuit provides a signal corresponding to the pedestal level+noise that is the level after the reset is released and settled. The pedestal read-out circuit comprises a SH switch transistor 621 controlled by a signal 622, a SH capacitor 623, a high speed bus driver amplifier 625, a select transistor 626 clocked by column select signal 631, and an output bus 627. The three parallel read-out circuits enable simultaneous multiple outputs without a need for speed increase.

Column buffer 600 implementation shown in FIG. 3A is with N-type transistors. However column 600 can be implemented with opposite polarity transistors such as P-type transistors, or a combination of P-Type and N-Type transistors. The appropriate circuit changes which are obvious to anyone who is skilled in the art are not shown here.

It is also important to note that pixel 500 transistor type implementation is independent of column 600 transistor type implementation and any combination of polarities is an option.

FIG. 3B is a timing diagram for the triple sampling and simultaneous read-out operations for pixel 500 and column buffer 600 in accordance with one embodiment of the current invention. During a row select clock cycle 507 when an individual row of pixels is selected, at least, but not limited to, three samples are read-out simultaneously. First, the signal that corresponds to the photon-generated charge accumulated on photodiode 501 during the previous integration time (i.e., previous frame) appears on a column bus node 509 and is sampled at the falling edge of a sample-and-hold (SH) pulse 602. The signal level+noise on a node 604 in the signal read-out circuit is stored across SH capacitor 603. Next, when all pixels in the selected row are reset via reset signal 503, the reset+noise level appears on column bus node 509 and is sampled at the falling edge of signal (reset sample-and-hold (SH) pulse) 612 and the level on a node 614 in the reset read-out circuit is stored across SH (reset) capacitor 613. Lastly, the pedestal (pedestal level or blanking level) appears on column bus node 509 at the end of a settling period after reset signal 503 is released. The pedestal is sampled at the falling edge of signal (pedestal sample-and-hold (SH) pulse) 622. The pedestal level+noise on a node 624 in pedestal read-out circuit is stored across SH (pedestal) capacitor 623. Additional samples for reducing noise (e.g., averaging) or for increasing dynamic range (e.g., multiple signal samples during the integration time period) can be added accordingly between the three samples described here.

Once the last sample (the pedestal that is the third sample in the implementation shown here) is taken at the falling edge of signal 622, column select clock 631 is activated and the simultaneous readout off the three or more samples described here take place for all pixels in the current selected row.

The samples are stored either digitally or in analog form in either an off-chip circuitry or an on-chip circuitry not shown here and are processed, such as shown and described with respect to FIGS. 4A and 4B, to provide an ultra-low noise signal.

The current invention is not limited to pixel 500 shown here and may be implemented with different types of pixels, for example a 3T APS with non-inverting amplifier such as, but not limited to, the one shown in FIG. 2A.

The current invention is also not limited to column buffer 600 shown here with three simultaneous readout blocks and output buses. The current invention may be implemented utilizing a column buffer with different number of readout blocks connected and/or multiplexed to different number of outputs. To name only few—for example a column buffer with a single faster readout block such as but not limited to the one shown in FIG. 2A, which allows the multiple samples to be read out sequentially to a single output bus, or a column buffer with a single readout block where the samples are multiplexed to multiple output buses for bandwidth reduction purpose. The alternative pixels and column buffers are not shown here; however, the timing that is required for operating 3T APS with a sequential readout column buffer in accordance with the current invention triple sampling and processing is provided in FIG. 5.

The current invention is not limited to the triple sampling of signal, reset and pedestal as depicted here. Schemes of multiple signal samples, and/or multiple reset samples, and/or multiple pedestal samples for various reasons such as averaging or dynamic range expansion can be implemented without changing the fundamentals of the invention. In one example: without altering the basic timing shown in FIG. 3B, any one who is skilled in the art can perceive the addition of sample and hold pulses for sampling the reset anytime during the reset pulse for the purpose of averaging the reset value.

FIG. 4A depicts a method 700 for processing to compute ultra-low noise output samples based on multiple samples from consecutive frames in accordance with one embodiment of the current invention. A pipeline of one frame (e.g., one frame delay) is required as can be seen from the following. Let i be the frame number, where i=0, 1, 2, . . . . Assuming S is the sample corresponding to the photon-generated charge accumulated on photodiode 501, then S=Signal+Vp+kTC+FPN+1/f, where Vp is the capacitive feed through from the reset transistor. Assuming R is the Reset sample, then R=$V_{RESET}$+FPN+1/f. Assuming P is the pedestal sample, then P=$V_{RESET}$+Vp+kTC+FPN+1/f. Let G be the gain of amplifier 505 (as described in FIG. 3A). After a frame pipeline of 1 (i.e., when i>0), the output sample D(i) is derived from referencing the S(i) to P(i−1) and to the difference between R(i) and R(i−1) adjusted to G as presented in FIG. 4A, thus reducing both kTC, FPN, and 1/f noise.

FIG. 4B illustrates one implementation 800 for processing method 700 in accordance with one embodiment of the current invention. Implementation 800 depicted in FIG. 4B supports the pipeline and the arithmetic steps required for computing ultra-low noise output sample based on multiple samples from consecutive frames as shown in FIG. 4A. In implementation 800, two frame buffers 804 and 805 are provided for the pipeline of the samples. Another frame buffer 806 is provided for receiving the processed output frame but can be omitted. The number of frame buffers is not limited to what is shown here. The process is assumed to be performed in real-time and to continue as long as samples are available on output buses 607, 617 and 627 as explained in the previous figures. Implementation 800 assumes that the signal is integrated down from the reset level and inverted by inverting amplifier 505, but can easily be adapted to a non-inverting amplifier or an opposite integration.

At step 850, frame buffers 804-806 and a frame counter 801 are all reset or cleared to zero. Frame counter 801 advances with every new frame (e.g., on frame sync or similar). A line counter (also referred to as row counter) 802, which advances with every new line (e.g. on row select clock or similar), is reset to zero at the beginning of a new frame in step 852. A column counter (also referred to as a pixel counter) 803, which advances with every new column (e.g. on column select clock or similar), is reset to zero at the beginning of a new line (row) at step 854. Frame counter 801, as explained previously, continues to advance as long new frames are available (also referred to as live scan mode). In order to prevent overflow, it is reset to 1 (one) when it reaches a predefined limit (e.g., 0xffff for a 16 bit unsigned integer counter). When the pipeline is full, i.e., the previous frame reset and pedestal samples are available in buffers 804 and 805, respectively, the now available previous frame signal is referenced to stored pedestal and the difference between the new current frame reset and the stored previous frame reset is calculated and subtracted from the signal to account for the 1/f drift during integration time period. The result sample is stored in the appropriate pixel location (i.e., based on column and line counters 802 and 801, respectively).

In particular, at step 856, the signal, reset, and pedestal are read from output buses 607, 617, and 627, respectively. If frame counter 801 is zero (i.e., at the first frame), as determined in step 858, the current reset and pedestal are stored in buffers 804 and 805, respectively, in step 862. If frame counter 801 is greater than zero (i.e., after a first frame is scanned), value Di from FIG. 4A is calculated and stored in buffer 806 at step 860. The current reset and pedestal are stored in buffers 804 and 805, respectively, in step 862 and processing continues.

In step 864, column counter 803 is increased by one. If there are more columns, as determined in step 866, the next signal, reset, and pedestal are read in step 856 and processing continues as before. However, if there are no more columns, line counter 802 is incremented by one in step 868, and if there are more lines, as determined in step 870, column counter 803 is reset and processing continues with the next signal, reset, and pedestal being read in step 856. If there are no more lines, frame counter 801 is incremented by one at step 872. If there are no more frames, as determined in step 874, processing stops, and the value stored at buffer 806 represents the output sample with reduced kTC, FPN, and 1/f noise. However, if more frames exist, frame counter 801 is checked to see if the limit is reached at step 876. If so, frame counter 801 is reset to one at step 878. Processing then continues by resetting line counter 802 and column counter 803 at steps 852 and 854, respectively, and the signal, reset, and pedestal read at step 856.

The processing implementation is not limited to implementation 800 shown here and can be realized in various ways. To name few, for example, implementation 800 assumes real-time mode as explained previously. It can be adapted for an off-line mode when all the previously acquired frames are stored in memory. Furthermore, implementation 800 assumes that the signal is integrated down from the reset level and is inverted by an inverting amplifier hence subtracts the reference from the signal. It can be easily adapted to a non-inverting amplifier or opposite integration (i.e., subtract the signal from the reference). Also, the number of frame buffers is not limited to the three shown here. For example, output buffer 806 can be eliminated and the processed samples can be directly transferred to another logical block, such as a display block. In addition, implementation 800 utilizes a frame counter 801 in order to control the pipeline mechanism. An example of an alternative implementation is the use of a flag (e.g., Boolean element) that indicates whether the first frame is already available. Also, counters 802 and 803 may be replaced with, for example, pointers to memory. Furthermore, if the output samples are not stored but rather transferred to a different block and new frames are indicated by, for example, a frame sync signal, counters 802 and 803 may be eliminated altogether. In addition, the signal processing circuitry and the memory for the buffers may be implemented off-chip or on-chip. The algorithm may be implemented in digital domain, in analog domain or in a mixed mode (e.g., some subtraction operations are performed in analog domain while the other are performed on the stored digitized results). It is also important to note that the equation depicted in FIG. 4A can be reorganized differently utilizing arithmetic rules and the implementation depicted in FIG. 4B may be altered accordingly. More implementations are possible and are not discussed here.

Figure 5:
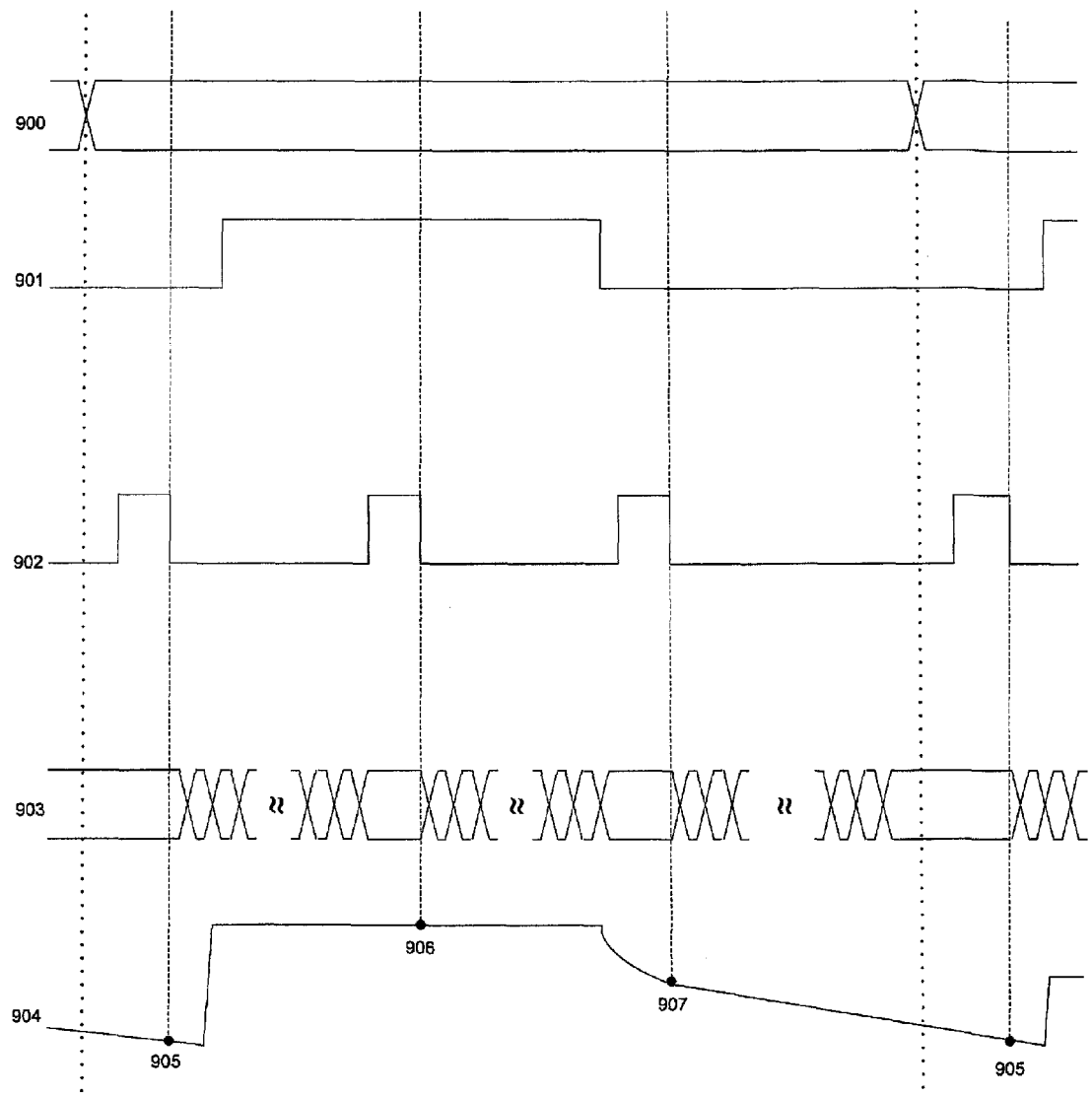
FIG. 5 shows a timing diagram for the multiple sampling operation in accordance with another embodiment of the current invention.

FIG. 5 provides a timing scheme for another embodiment of the current invention. As explained previously, the current invention triple sampling and processing can be implemented utilizing various types of pixel cell designs and column buffer designs. For example, one is the 3T (transistor) active pixel cell and single sample and hold column buffer, such as shown in FIG. 2A. FIG. 5 shows a suitable timing diagram for generating an ultra-low noise sample, according to one embodiment of the invention, using such a known design FIG. 5 depicts the relationships between a row select clock 900, a reset pulse 901, a column SH pulse 902, a read-out clock 903, and a signal 904 that appears on an output bus (e.g., bus 407 in FIG. 2A).

Pixels residing in a row are sampled during a cycle of row select clock 900. First, the previously accumulated photon-generated charge on the sensing element (e.g., photodiode 301 in FIG. 2A) is sampled on the falling edge of a first one of sample and hold pulse 902 (corresponding to SH pulse 402 in FIG. 2A). The sampled signal 905 for each pixel in the row is then read-out during the first group of read-out cycles 903 (e.g., column select 406 in FIG. 2A). Next, the sensing element is reset during reset pulse 901 (e.g., reset signal 303 in FIG. 2A). Once settled, the reset level+noise is sampled (at 906) on the falling edge of a second one of sample and hold pulse 902. Reset sample 906 for each pixel in the row is then read out during the second group of readout cycles 903. Reset pulse 901 is held high until all reset samples for all pixels in the row have been read out and released after the last read-out cycle 903 of the second group. Last, at the end of a settling period after reset pulse 901 has been released, the pedestal is sampled (at 907) on the falling edge of a third one of sample and hold pulse 902. Pedestal sample 907 for each pixel in the row is then read out during the third (last) group of read-out cycles 903.

Once stored, the samples are processed as depicted in FIG. 4A to provide kTC, FPN and 1/f reduction that results in an ultra-low noise sample.

The current invention is not limited to the triple sampling of signal, reset and pedestal as depicted here. Schemes of multiple signal samples, and/or multiple reset samples, and/or multiple pedestal samples for various reasons such as averaging or dynamic range expansion can be implemented without changing the fundamentals of the invention. In one example: without altering the basic timing shown in FIG. 5, any one who is skilled in the art can perceive the addition of sample and hold pulses for sampling the reset anytime during the reset pulse and additional corresponding reading cycles for the purpose of averaging the reset value.

Having thus described embodiments of the present invention, persons of ordinary skill in the art will recognize that changes may be made in form and detail without departing from the scope of the invention. Thus the invention is limited only by the following claims.

What is claimed is:

1. A column buffer for use with at least one pixel cell, the column buffer comprising:
   an amplifier coupled to an output of the pixel cell;
   a signal read-out circuit comprising:
      a first transistor coupled to an output of the amplifier;
      a driver amplifier coupled to the first transistor;
      a capacitor having a first node coupled between the first transistor and the driver amplifier and a second node coupled to ground; and
      a second transistor coupled to an output of the driver amplifier;
   a reset read-out circuit comprising:
      a first transistor coupled to the output of the amplifier;
      a driver amplifier coupled to the first transistor;
      a capacitor having a first node coupled between the first transistor and the driver amplifier and a second node coupled to ground; and
      a second transistor coupled to an output of the driver amplifier; and
   a pedestal read-out circuit comprising:
      a first transistor coupled to the output of the amplifier;
      a driver amplifier coupled to the first transistor;
      a capacitor having a first node coupled between the first transistor and the driver amplifier and a second node coupled to ground; and
      a second transistor coupled to an output of the driver amplifier.

2. The column buffer of claim 1, wherein the first transistor of each of the signal, reset, and pedestal read-out circuit has a gate coupled to a separate sample-and-hold pulse.

3. The column buffer of claim 1, wherein the second transistor of each of the signal, reset, and pedestal read-out circuit has a gate coupled to a clock signal.

4. The column buffer of claim 1, wherein outputs of the second transistors of each of the signal, reset, and pedestal read-out circuits are provided in parallel.

5. The column buffer of claim 1, wherein the first and second transistors of each of the signal, reset, and pedestal read-out circuits are N-type transistors.

6. The column buffer of claim 1, wherein the first and second transistors of each of the signal, reset, and pedestal read-out circuits are P-type transistors.

7. The column buffer of claim 1, wherein the first and second transistors of each of the signal, reset, and pedestal read-out circuits are a combination of P-type and N-type transistors.

8. The column buffer of claim 1, wherein a plurality of pixel cells are coupled to the amplifier.

9. The column buffer of claim 1, wherein output signals of the signal, reset, and pedestal read-out circuits are multiplexed to a plurality of output buses.

10. The column buffer of claim 1, wherein output signals of the signal, reset, and pedestal read-out circuits are multiplexed to a single output bus.

11. The column buffer of claim 1, wherein the pixel cell comprises:
a photo-sensitive element;
a capacitor having first and second terminals, wherein a terminal of the photo-sensitive element and the first terminal of the capacitor are connected to a first node;
an output line of the cell being a second node, wherein the second terminal of the capacitor connected to the second node;
a first transistor coupled between the first and second nodes;
a second transistor coupled between the second node and ground and having a gate coupled to the first node; and
a third transistor coupled between the second transistor and the second node.

12. A method of operating a column buffer with a pixel cell array, the method comprising:
sampling a signal level during a select cycle;
sampling a reset level after pixels in a selected row of the pixel cell array are reset, prior to releasing a reset signal and during the select cycle; and
sampling a pedestal level after the reset signal is released and during the select cycle.

13. The method of claim 12, wherein the signal level, reset level, and pedestal are read out simultaneously.

14. The method of claim 12, further comprising multiplexing the signal level, the reset level, and the pedestal to a plurality of output buses.

15. The method of claim 12, further comprising multiplexing the signal level, the reset level, and the pedestal to a single output bus.

16. The method of claim 12, wherein the signal level corresponds to a photon-generated charge accumulated on a photo-sensing element of the pixel cell.

17. The method of claim 12, wherein the sampling is for a plurality of signal levels, reset levels, and/or pedestals.

18. The method of claim 12, further comprising sampling multiple signal levels during the select cycle.

19. The method of claim 12, further comprising sampling multiple reset levels during the select cycle.

20. The method of claim 12, further comprising sampling multiple pedestal levels during the select cycle.

* * * * *